US009078411B2

(12) United States Patent
Simon et al.

(10) Patent No.: US 9,078,411 B2
(45) Date of Patent: Jul. 14, 2015

(54) ARRANGEMENT AND METHOD FOR IMPEDING PET ACCESS TO FOOD IN A FEED VESSEL TO DETER TOO RAPID INGESTION OF FOOD

(71) Applicants: David Frederick Simon, Lakeland, FL (US); Jeff Magsitza, Thiels, NY (US)

(72) Inventors: David Frederick Simon, Lakeland, FL (US); Jeff Magsitza, Thiels, NY (US)

( * ) Notice: Subject to any disclaimer, the term of this patent is extended or adjusted under 35 U.S.C. 154(b) by 55 days.

(21) Appl. No.: 13/649,229

(22) Filed: Oct. 11, 2012

(65) Prior Publication Data

US 2013/0125823 A1    May 23, 2013

Related U.S. Application Data

(60) Provisional application No. 61/560,865, filed on Nov. 17, 2011.

(51) Int. Cl.
*A01K 5/00* (2006.01)
*A01K 5/01* (2006.01)

(52) U.S. Cl.
CPC ............. *A01K 5/0114* (2013.01); *A01K 5/0135* (2013.01)

(58) Field of Classification Search
CPC .. A01K 5/0114; A01K 5/0135; A01K 5/0142
USPC ............ 119/61.5, 61.54, 61.55, 61.57, 61.53, 119/58, 59, 61.3; 220/574, 574.1, 630; 206/814

See application file for complete search history.

(56) References Cited

U.S. PATENT DOCUMENTS

| 2,600,103 | A | * | 6/1952 | Feck | 119/77 |
| D194,325 | S | * | 1/1963 | Swett | D7/505 |
| 3,079,099 | A | * | 2/1963 | Blain | 242/597.5 |
| D195,072 | S | * | 4/1963 | Kolarik | D28/76 |
| 3,622,010 | A | * | 11/1971 | Renelt | 211/85.5 |
| 5,271,508 | A | * | 12/1993 | Gamwell | 209/682 |
| 5,467,738 | A | * | 11/1995 | Cass | 119/61.53 |
| 5,794,562 | A | * | 8/1998 | Hart | 119/52.4 |
| 5,829,384 | A | * | 11/1998 | Landry | 119/52.3 |
| 6,164,616 | A | * | 12/2000 | Woods et al. | 248/686 |
| 6,581,541 | B2 | * | 6/2003 | Hollinger | 119/61.54 |
| 6,860,229 | B1 | * | 3/2005 | Craft | 119/61.5 |
| D600,861 | S | * | 9/2009 | Sin | D30/129 |
| 8,360,005 | B1 | * | 1/2013 | Allen | 119/61.53 |
| 2009/0255475 | A1 | * | 10/2009 | Black | 119/53 |

* cited by examiner

*Primary Examiner* — Rob Swiatek
*Assistant Examiner* — Ebony Evans
(74) *Attorney, Agent, or Firm* — John R. Benefiel

(57) ABSTRACT

An arrangement and method for restricting access by a pet to food in a feeding bowl in which a covering piece is supported at an elevated position extending partially over food in the bowl, thereby impeding access to the food thereby deterring a too rapid ingestion of food. The pedestal is preferably detachably fixed to the bottom of the bowl as by a suction cup mount. The covering piece can be detachably mounted to an upper end of the pedestal to be easily replaced.

18 Claims, 4 Drawing Sheets

ARRANGEMENT AND METHOD FOR IMPEDING PET ACCESS TO FOOD IN A FEED VESSEL TO DETER TOO RAPID INGESTION OF FOOD

CROSS REFERENCE TO RELATED APPLICATIONS

This application claims the benefit of U.S. provisional application No. 61/560,865 filed on Nov. 17, 2011, incorporated herein b reference.

BACKGROUND OF THE INVENTION

This invention concerns feeding pets, particularly dogs and cats. It sometimes occurs that a pet will eat too rapidly, and gulp down the food provided. This can create problems since excess ingestion of air with the food often results, causing flatulence, vomiting, or, more seriously, bloating which can threaten a dog's life if prompt medical treatment for the condition is not obtained.

Such wolfing down of food is a matter of habit and could be corrected if the pet is consistently restrained from eating too quickly. Commonly as one recommended measure, pet owners are warned to not elevate the pet's feeding bowl, but this has not been found to be a complete remedy.

Another measure which has been practiced is installing pegs in the bottom of the bowl which protrude up into the feed and have some restricting effect on feeding behavior, but insufficient in many instances and tends to create an unnatural manner of eating.

After only a short time, a dog will typically develop avoidance techniques which still allow a too-rapid ingestion of the food despite the presence of the pegs.

It is an object of the present invention to provide an arrangement associated with a feed vessel to reduce the rate at which the pet can consume food placed therein.

SUMMARY OF THE INVENTION

The above recited object and other objects which will be understood upon reading the following specification and claims are achieved by a method and arrangement which impedes access to the food to deter rapid ingestion of the food. The arrangement includes an upright pedestal fixed to the bottom of the bowl, preferably so as to allow ready detachment as by the use of suction cup connected to the bottom of the pedestal.

A radially extending covering piece is attached to the upper end of the pedestal extending out across the open top of the vessel, partially covering the same so as to impede ready access by a pet to food placed in the vessel cavity beneath the covering piece. The radially extending covering piece may take a great many different forms including two or more arms projecting radially out from the upper end of the pedestal, or a radial cross bar which can have a series of ribs successively mounted extending across the cross bar and out over the bowl or vessel cavity.

The presence of the covering piece partially impedes the pet's access to food disposed in the bowl or other vessel beneath the covering piece, deterring too rapid ingestion of food, necessitating avoidance of the covering piece when attempting to reach the food.

Preferably, the clearance between the covering piece and rim of the vessel varies to require differing effort to extract food from spaces about the perimeter of the bowl.

The covering piece may also define pockets or receptacles for the containment of treats, etc.

The covering piece can either be fixedly attached or rotatably mounted atop the pedestal.

The covering piece can have snap fitted elements to enable convenient replacement or reconfiguration thereof to counter the animal's efforts at developing techniques allowing a speed up in the rate of eating the food.

Cavities in the covering can be provided to allow treats to be placed therein, distracting the pet to likewise slow the rate of eating of the food in the bowl.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
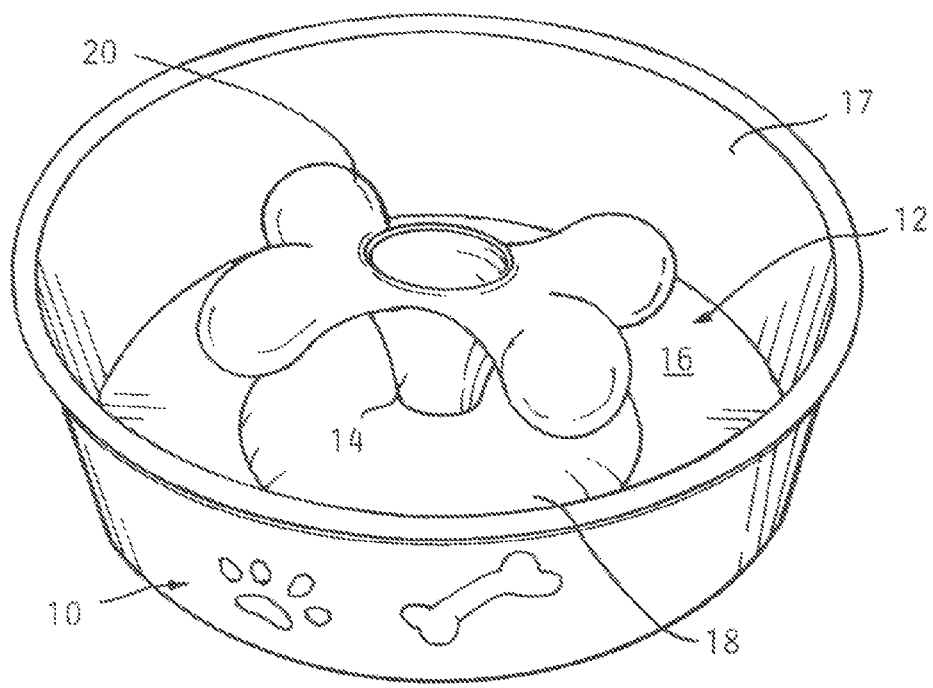
FIG. 1 is a pictorial view of a pet feeding bowl having an arrangement of a pedestal mounted covering piece radially extending out over the food in the bowl installed therein.
Figure 2:
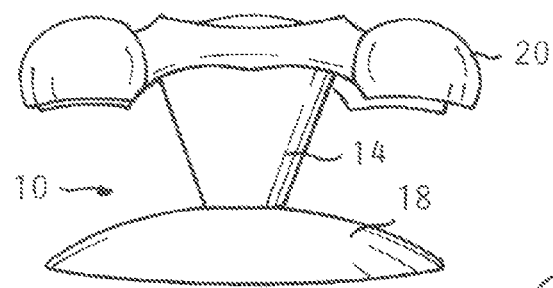
FIG. 2 is front view of the elevated covering piece shown in FIG. 1.
Figure 2A:
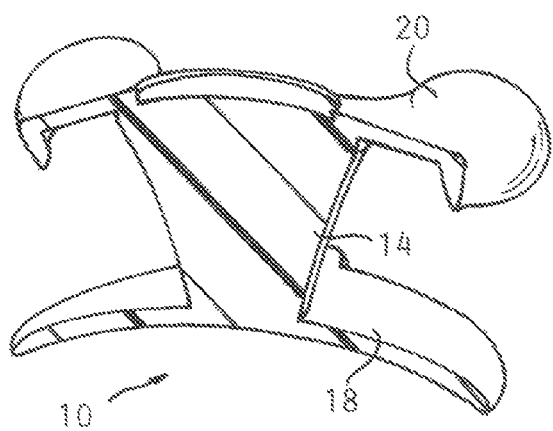
FIG. 2A is a sectional view of the covering piece shown in FIG. 2.
Figure 3:
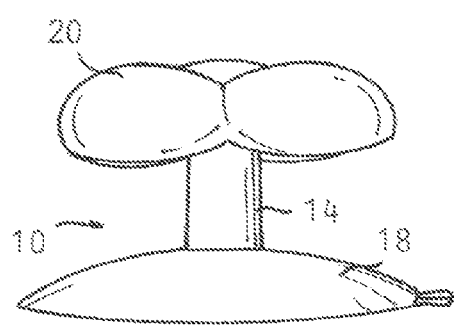
FIG. 3 is a side view of the arrangement shown in FIGS. 1 and 2.

Referring to the drawings and particularly FIG. 1-3, a conventional pet feeding vessel such as the bowl 10 shown, has an arrangement 12 installed therein according to the invention, fixed to the bottom wall 16 of the bowl 10. The arrangement includes a vertically extending pedestal 14 preferably detachably secured to the bottom wall inner surface 16 by means of a suction cup 18 which can be made to be integral with the bottom pedestal 14.

A radially extending partial covering piece 20 is affixed to the top of the pedestal 14 as by being made integral therewith, thereby being substantially positioned at a fixed lateral position and to be elevated above the bottom wall inner surface 16 so that a space beneath the partial covering piece 20 and the bottom 16 is defined for accommodating pet food.

The covering piece 20 extends radially out from the top of the pedestal 14, preferably in two or more radial directions as shown. The covering piece 20 leaves varying size spaces between its outer perimeter and the bowl rim 17 through which the pet can access the food. This necessitates different efforts to extract food such as with the teeth or with the tongue. Access to the food is partially obstructed to deter rapid gulping down of the food, since the pet must maneuver around the piece 20.

This is a more natural feeding activity as foraged food in the wild rarely presents itself so easily to the animal for ingestion as being piled in a bowl.

The arrangement 12 is advantageously molded from a tough chew resistant but non toxic elastomeric material such as polypropylene or nylon plastics, which are easily cleaned and dishwasher safe.

The covering piece 20 can be shaped in many different shapes as long as the degree of covering is substantial enough to be effective in limiting access to the food in the bowl so as to impede feeding, resulting in the animal ingesting food at a relatively moderate pace as the food is extracted through the opening spaces by its jaws or by use of its tongue.

This will over time develop eating habits which are more measured even if the invention is not always in place.

FIGS. 4A-4I show various alternate configurations of the covering piece 20.

Figure 4A:
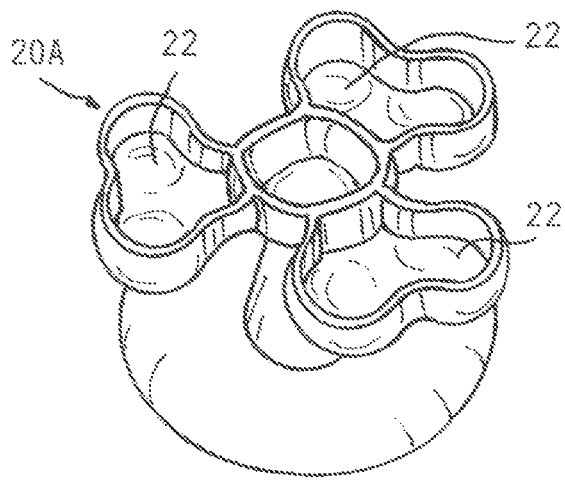
FIG. 4A is a pictorial view of an alternate form of a covering piece included in the arrangement according to the invention.

As seen in FIG. 4A, the covering piece 20A may extend in three radial directions and be formed with upwardly facing pockets 22 into which food or special treats can be deposited.

The presence of the treats itself will slow the pet's feeding by distracting it and focusing its attention on particular food items.

Figure 4B:
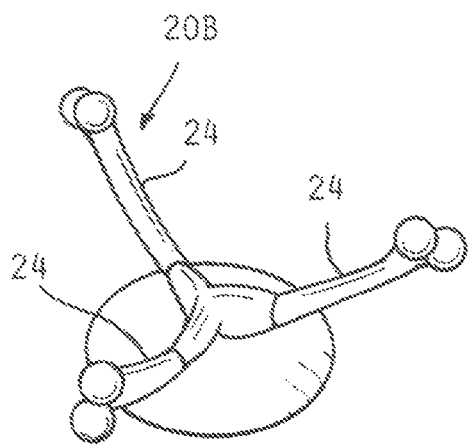
FIG. 4B is a pictorial view of yet another form of the covering piece included in an arrangement according to the invention.

FIG. 4B shows a covering piece 20B with three slender longer arms 24 extending radially out and which also curve upwardly.

Figure 4C:
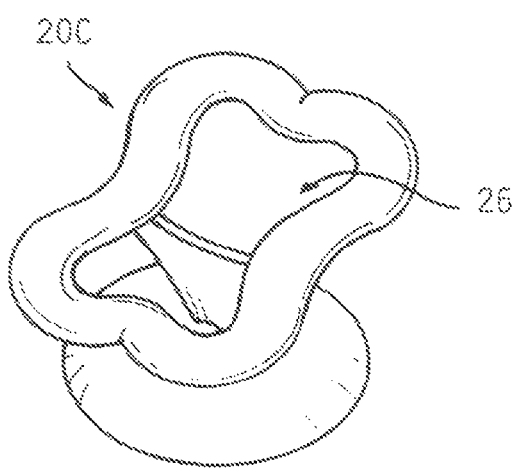
FIG. 4C is a pictorial view of still another form of the covering piece in the arrangement according to the invention.

FIG. 4C shows a generally planar extending radially horizontally covering piece 20C which has an opening 26 therein.

Figure 4D:
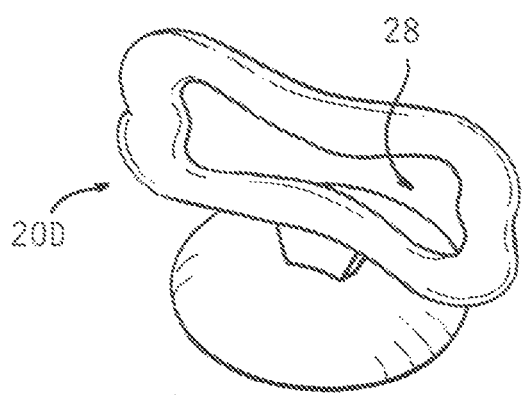
FIG. 4D is a pictorial view of another form of covering piece in an arrangement according to the invention.

FIG. 4D shows a generally planar covering piece 20D which is disposed vertically and on edge, with an opening 26.

Figure 4E:
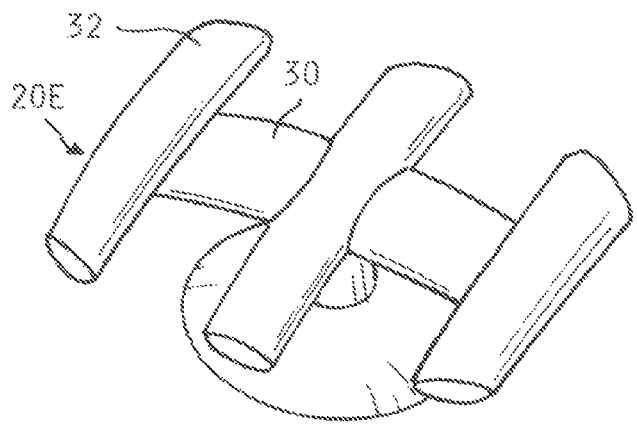
FIG. 4E is a pictorial view of still another form of covering piece in an arrangement according to the invention.

FIG. 4E shows a covering piece 20E which is comprised of a radially extending cross bar 30 mounting a series of partial ribs 32 extending in a chordal direction.

Figure 4F:
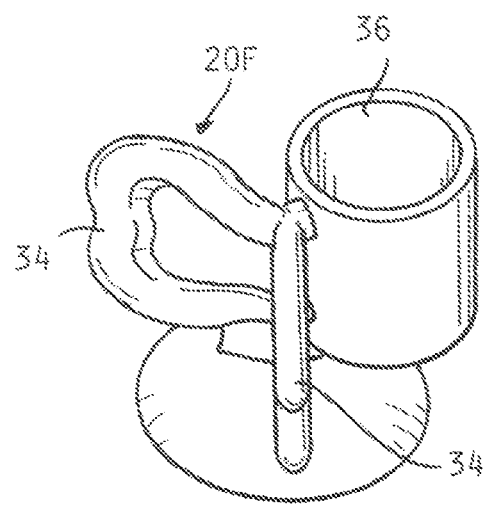
FIG. 4F is a pictorial view of still another form of covering piece in an arrangement according to the invention.

FIG. 4F shows a covering piece 20F with two hollow radially extending paddle elements 34 vertically disposed and a cup 36 which also can contain food or special treats.

Figure 4G:
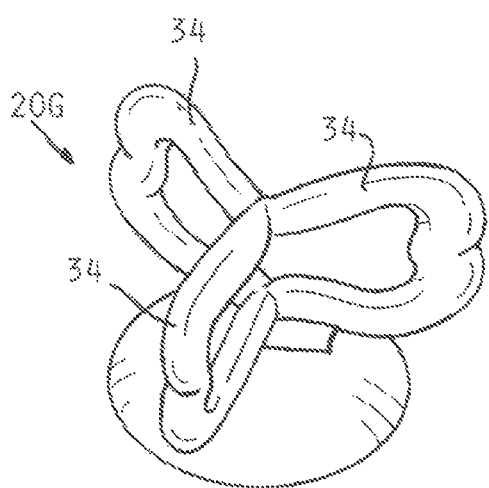
FIG. 4G is a pictorial view of still another form of covering piece in an arrangement according to the invention.

FIG. 4G shows a covering piece 20G which is comprised of three radially extending on edge hollow paddle elements 34.

Figure 4H:
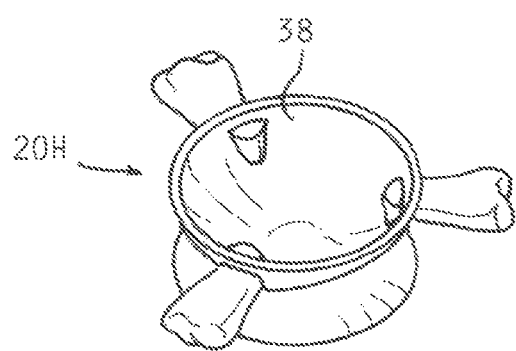
FIG. 4H is a pictorial view of still another form of covering piece in an arrangement according to the invention.

FIG. 4H shows a covering piece 20H comprised of three radially extending flat paddle elements 36 projecting from a central cup 38, also able to receive treats.

Figure 4I:
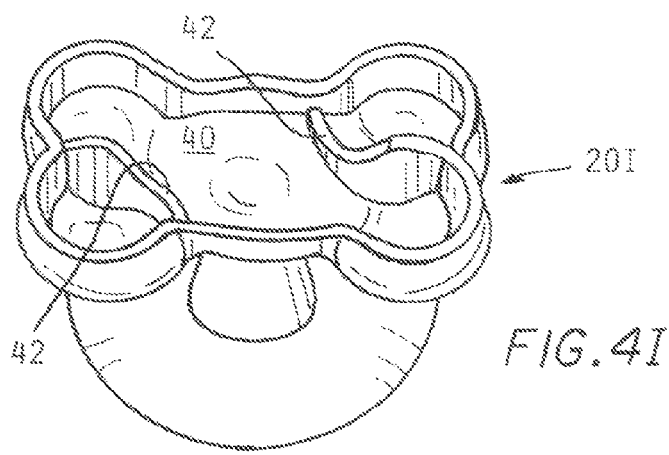
FIG. 4I is a pictorial view of still another form of covering piece in an arrangement according to the invention.

FIG. 4I shows a covering piece 20I similar to that shown in FIGS. 1-3, but with a hollowed out upper side to form a treat receiving cavity 30, with partitions 42 subdividing the space 40.

Figure 4J:
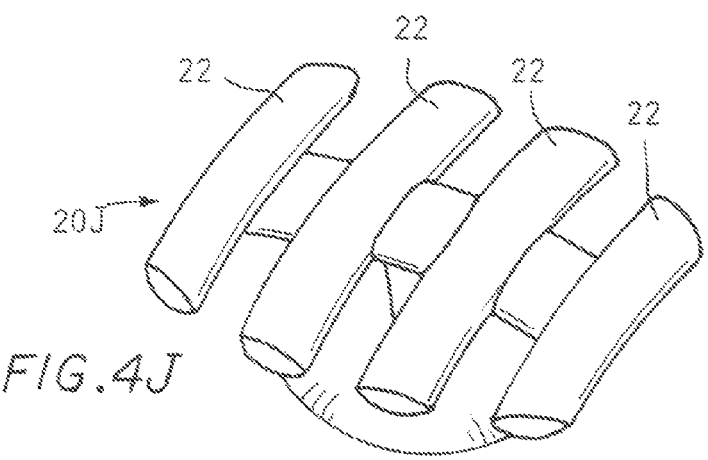
FIG. 4J is a pictorial view of a covering piece having an additional rib.

FIG. 4J shows a covering piece 20, which is similar to that shown in FIG. 4E, but with an additional rib 22.

It can be appreciated that any number of particular shapes are possible.

Since particular shapes of covering pieces will define differently configured openings they require different techniques to access the food, switching between shapes may be advantageous to discourage the development of techniques allowing too rapid ingestion of food.

Figure 5:
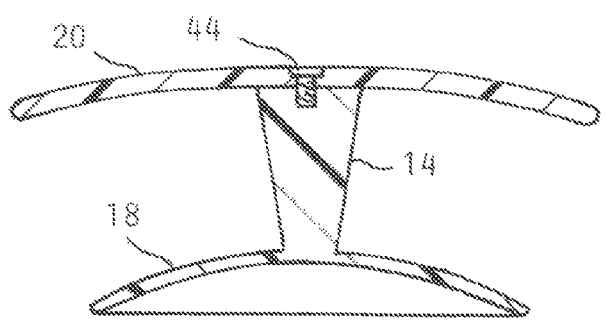
FIG. 5 is a sectional view of a replaceable covering piece embodiment of an arrangement according to the invention.

Detachable pieces 20 may be provided by a snap fit construction (not shown), or as shown in FIG. 5, a screw 44 mounting can be employed to provide detachability of the pieces 20 for ready replacement.

Figure 6:
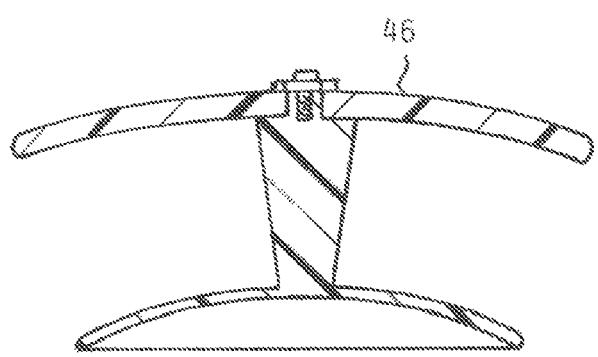
FIG. 6 is a section view of a rotatably mounted covering piece in an arrangement according to the present invention.

FIG. 6 shows a spinner mount for a covering piece 46 allowing the covering piece 46 to be rotated by the pet in its attempts to access the food between the covering piece 46.

The invention claimed is:

1. An arrangement for restricting access by a pet to food in an open topped feed vessel to slow the consumption of food from the vessel by the pet, comprising:
   a pedestal;
   an attachment for securing the pedestal to an inner surface of a bottom wall of said vessel so as to be held in an upright position within said vessel; and
   a covering piece mounted to an upper end of said pedestal to be held laterally fixed within said vessel and having one or more portions extending radially therefrom a substantial distance so as to cover a substantial part of said vessel open top while leaving one or more intervening radially extending spaces between an outer perimeter of said one or more portions and the inside of a rim of said vessel located opposite said one or more portions, which one or more spaces are sized to provide only a substantially reduced access to food in said vessel through said open top thereof, whereby access by a pet to food deposited in said vessel in a lower space therein below said covering piece one or more portions is substantially restricted to said one or more intervening spaces to thereby force the pet to avoid the covering piece one or more portions while eating and thereby slow the pet's consumption of food in said vessel.

2. The arrangement according to claim 1 wherein said attachment comprises a suction cup attached to a lower surface of a bottom wall of said pedestal and adapted to be releasably attached to said bottom wall of said vessel.

3. The arrangement according to claim 1 wherein said covering piece has one or more cavities recessed into an upper surface thereof for receiving treats for a pet.

4. The arrangement according to claim 1 wherein said covering piece one or more portions includes at least two arms extending horizontally from said upper end of said pedestal in different radial directions, said arms covering a substantial portion of said open top of said vessel.

5. The arrangement according to claim 1 wherein said covering piece is readily detachable from said upper end of said pedestal to enable replacement with another covering piece.

6. The arrangement according to claim 1 wherein said covering piece is rotatably mounted to said pedestal upper end.

7. The arrangement according to claim 1 wherein said covering piece has covering portions extending at different radial distances from said pedestal upper end to said vessel rim to create varying size intervening spaces defined between the inside of said rim of said vessel and an outer portion of said covering piece.

8. The arrangement according to claim 1 in combination with a food bowl comprising said vessel.

9. The arrangement according to claim 1 wherein intervening spaces are defined between two or more of said covering piece portions.

10. An arrangement for restricting access by a pet to food in an open topped feed vessel to slow the consumption of food from the vessel by the pet, comprising:

a pedestal;

an attachment for securing the pedestal to an inner surface of a bottom wall of said vessel so as to be held in an upright position within said vessel;

a covering piece mounted to an upper end of said pedestal to be held laterally fixed within said vessel with portions of said covering piece extending radially out from said upper end of said pedestal a substantial distance so as to cover a substantial portion of said vessel open top while leaving radially extending intervening spaces between said covering piece portions and between an outer perimeter of said covering piece portions and the inside of a rim of said vessel, said covering piece portions sized to provide limited size access space through said covering piece to reach food in said vessel, whereby access by a pet to food deposited in said vessel in a lower space therein below said covering piece portions is substantially restricted by said intervening spaces to thereby force the pet to avoid the covering piece portions while eating and thereby slow the pet's consumption of food in said vessel lower space; and said covering piece further including an open topped cup attached to said pedestal upper end with a series of flat paddles projecting radially and horizontally from a perimeter of said cup, said flat paddles comprising said covering piece portions.

11. A method of reducing the rate of consumption of food deposited in an open topped vessel by a pet, comprising:

installing a covering piece at an elevated laterally fixed position within said open topped vessel above an inner surface of a bottom wall of said vessel and opposite an outer rim of said vessel, said covering piece having radially extending portions configured so as to partially cover said food disposed beneath said covering piece while leaving intervening radially extending clearance spaces between said portions and between a perimeter of said covering piece and said outer rim of said vessel; said intervening radially extending clearance spaces allowing limited access to said food in said vessel to thereby limit said pet's access to said food to that provided only by said intervening spaces of said covering piece in attempting to ingest said food, and thereby slow its rate of eating said food.

12. The method according to claim 11 wherein said covering piece is installed by mounting a pedestal to said inner surface of said bottom wall of said vessel and mounting said covering piece to an upper end of said pedestal to position said covering piece at said elevated position above said vessel bottom wall inner surface.

13. The method according to claim 12 further including mounting said pedestal to said vessel bottom wall inner surface by affixing a suction cup to a lower end of said pedestal and engaging said vessel bottom wall inner surface with said suction cup.

14. The method according to claim 12 further including rotatably mounting said covering piece on said upper end of said pedestal to allow spinning movement thereon.

15. The method according to claim 12 further including mounting said covering piece to said pedestal upper end so as to be readily detachable therefrom and facilitate replacement thereof.

16. The method according to claim 11 further including forming open topped cavities in said covering piece to allow placement of food or treats therein.

17. The method according to claim 11 wherein said covering piece defines varying sized intervening spaces between an inside of a rim of said vessel and outer ends of said covering piece portions.

18. The method according to claim 11 wherein intervening spaces are defined between two or more of said covering piece portions.

* * * * *